United States Patent [19]

Haines

[11] Patent Number: 4,733,889

[45] Date of Patent: Mar. 29, 1988

[54] WEAR RESISTANT PIPE

[75] Inventor: Edwin L. Haines, Akron, Ohio

[73] Assignee: The Goodyear Tire & Rubber Company, Akron, Ohio

[21] Appl. No.: 20,303

[22] Filed: Mar. 2, 1987

[51] Int. Cl.$^4$ .............................................. F16L 9/14
[52] U.S. Cl. ...................................... 285/16; 285/55; 285/179
[58] Field of Search ..................... 285/16, 179, 55, 15

[56] References Cited

U.S. PATENT DOCUMENTS

| 1,183,308 | 5/1916 | Lepley et al. | 285/179 X |
| 2,560,114 | 7/1951 | Kennon | 285/182 X |
| 3,792,187 | 2/1974 | Depcrymski | 285/179 X |
| 4,447,076 | 5/1984 | Evans | 285/179 X |
| 4,461,498 | 7/1984 | Kunsman | 285/16 |
| 4,606,556 | 8/1986 | Metzger | 285/16 |
| 4,633,913 | 1/1987 | Carty et al. | 285/179 X |
| 4,641,864 | 2/1987 | Heine et al. | 285/179 |

FOREIGN PATENT DOCUMENTS 524744 4/1956 Belgium .............................. 285/179

Primary Examiner—Thomas F. Callaghan
Attorney, Agent, or Firm—D. O. Nickey

[57] ABSTRACT

A wear resistant elbow or bend for use in the pneumatic transport of abrasive materials which comprises an elastomeric liner (14) and a rigid outer shell (30). The elastomeric inner liner (14) has inlet and exit portions that are circular in cross section and connected to a segment that is a closed "U" shape in cross-section. The top of the "U" is the impingement surface (A) that is on the outside of the bend. The impingement surface (A) is essentially flat and on a plane or planes which are inclined so that the angle of incidence ($\alpha$) is at least 35°, but not more than 65° with reference to the axis of the inlet portion or the direction of the incoming flow of conveyed material (18).

10 Claims, 4 Drawing Figures

WEAR RESISTANT PIPE

FIELD OF THE INVENTION

The present invention relates to a wear resistant pipe segment which alters the direction of flow of the conveyed material and more particularly, to a novel configuration for a wear resistant angular pipe fitting or elbow having a replaceable elastomeric inner liner.

A novel angular pipe segment such as an elbow or the like is disclosed having an inner liner of a wear resistant elastomeric material and a supporting outer jacket wherein the angle of the incidence is at least 35°, but not more than 65° with reference to the direction of travel of the conveyed material and wherein the cross-sectional area measured through the impingement surface is at least 1.25 times greater than the cross-sectional area of the inlet of the pipe.

BACKGROUND OF THE INVENTION

The transport of solid material through a closed conduit or pipe has long been known in the art of material handling. Some of the materials transported are of an abrasive nature and the occurrence of erosion of the pipe or conduit sidewalls is well known. This undesirable erosion is commonly experienced throughout the material transport system but is most acute in the non-linear or angular pipe segments wherein the direction of flow of the abrasive material is altered.

In an attempt to reduce or eliminate the erosion of nonlinear pipe segments or elbows, a wide variety of shaping, diverting and strengthening strategies have been developed over the years. In general, the problem of erosion has been attacked through the use of a pipe comprising an inner liner, circular in cross-section, fabricated of an abrasion resistant material and an outer supporting shell.

U.S. Pat. No. 4,554,721 discloses a wear resistant pipe segment which has an inner, one piece wear resistant liner composed of a ceramic material and an outer supporting shell. The outer shell is longitudinally split to allow removal and replacement of the ceramic inner liner. A bed of refractory or other cushioning material between the liner and the shell cushions the interface and fills any gaps which may be present. The outer shell is fabricated as any standard segment of pipe even including the welding of flanges onto the metallic shell. The shell may then be split to allow insertion of bedding material and the inner liner. The two halves of the outer shell are then clamped together and secured to form the finished pipe segment. This patent does not suggest or disclose a flat impingement surface that is sloped at specific angles relative to the direction of the incoming flow.

U.S. Pat. No. 4,199,010 discloses wear resistant pipe bends comprising a monolithic liner of nitride-bonded silicon carbide attached to the inside wall of a curved pipe segment. The '010 patent discloses a monolithic ceramic liner of abrasion resistant material disposed within an outer metal shell having a bed of refractory material in the annular space there between. This patent further discloses an outer shell of curved pipe formed from a plurality of smaller straight pipe sections which are mitered angularly and assembled into a nonlinear shell around the monolithic inner liner.

U.S. Pat. No. 3,920,191 discloses a liner for ball mills, pebble mills, vibration mills and the like which consists of hollow, inflatable resilient bodies made of a suitable elastomer, such as rubber. The elastomeric body is inflated hydraulically or pneumatically. In a typical case the mill is lined with a hollow tube formed into a helix.

U.S. Pat. No. 3,559,694 discloses a removable insulation unit for surrounding pipe joints, particularly at fittings such as elbows, tees and the like which comprises a pair of relatively thin outer shells which are connectable by fastening means to form a cylinder cover. An insulation liner surrounded by a perforated member is secured within each shell member by hook members that extend inwardly from its inner wall.

U.S. Pat. No. 3,350,832 discloses a lining for a wall exposed to wear which comprises inner spaced panels and strips of elastomeric wear resistant material. Metal abutments are anchored on the strips and overlie metal flanges, anchored to and protruding from the panels along the walls. Clamping means engage the wall and the abutment for clamping the metal flanges between the wall and the abutments.

U.S. Pat. No. 1,518,705 discloses a pipe having a plurality of corrugations cast integral with the interior walls of said pipe. The corrugations are positioned with an angle less than 180° in the upper and lower portions of said pipe.

U.S. Pat. No. 1,246,189 discloses an elbow having a branch opening and an aperture in the elbow bend, wherein a wear liner is removably arranged within the elbow.

The use of an inner liner of abrasion resistant material, while significantly slowing the erosion of the nonlinear pipe segment, does not stop the occurrence of significant wear over an extended period of time. In each of the prior art designs, the removal and subsequent replacement of the inner erosion resistant liner proves to be difficult and costly.

Materials used for wear protection have been rubber, metal alloys, ceramics and plastics. The elastic materials used for wear protection are in contrast to other wear materials, soft and elastic, and frequently display greater resistance to abrasion than the hardest of the steel materials. Instead of using a high degree of hardness to consume kinetic energy by deforming and chipping the wear surface, rubber swallows the load by deflecting and returning to its original shape. Of major importance to the wear process is the angle of impact of the solid particles or impingement angle. The literature has disclosed that less wear is obtained with rubber as compared to any other wear material when the angle of impact is less than 5° or greater than 50°. Wear may be defined as the undesirable removal of material in the form of fine particles from the surface of a body by mechanical means.

The prior art pipe segments, while effectively reducing interior wear through the use of a wear resistant lining material have not eliminated it completely and replacement is sometimes a difficult and costly endeavor. The prior art has failed to appreciate that an elastomeric elbow with a flat impingement surface must have all angles of incidence of at least 35°, but not more than 65° and which has a cross-sectional area through the impingement surface of at least 1.25 times greater than the cross-sectional area of the inlet would provide superior performance in the conveyance of abrasive material.

The invention, its advantages and its features will be apparent to those skilled in the art from a consideration

SUMMARY OF THE INVENTION

Figure 1:
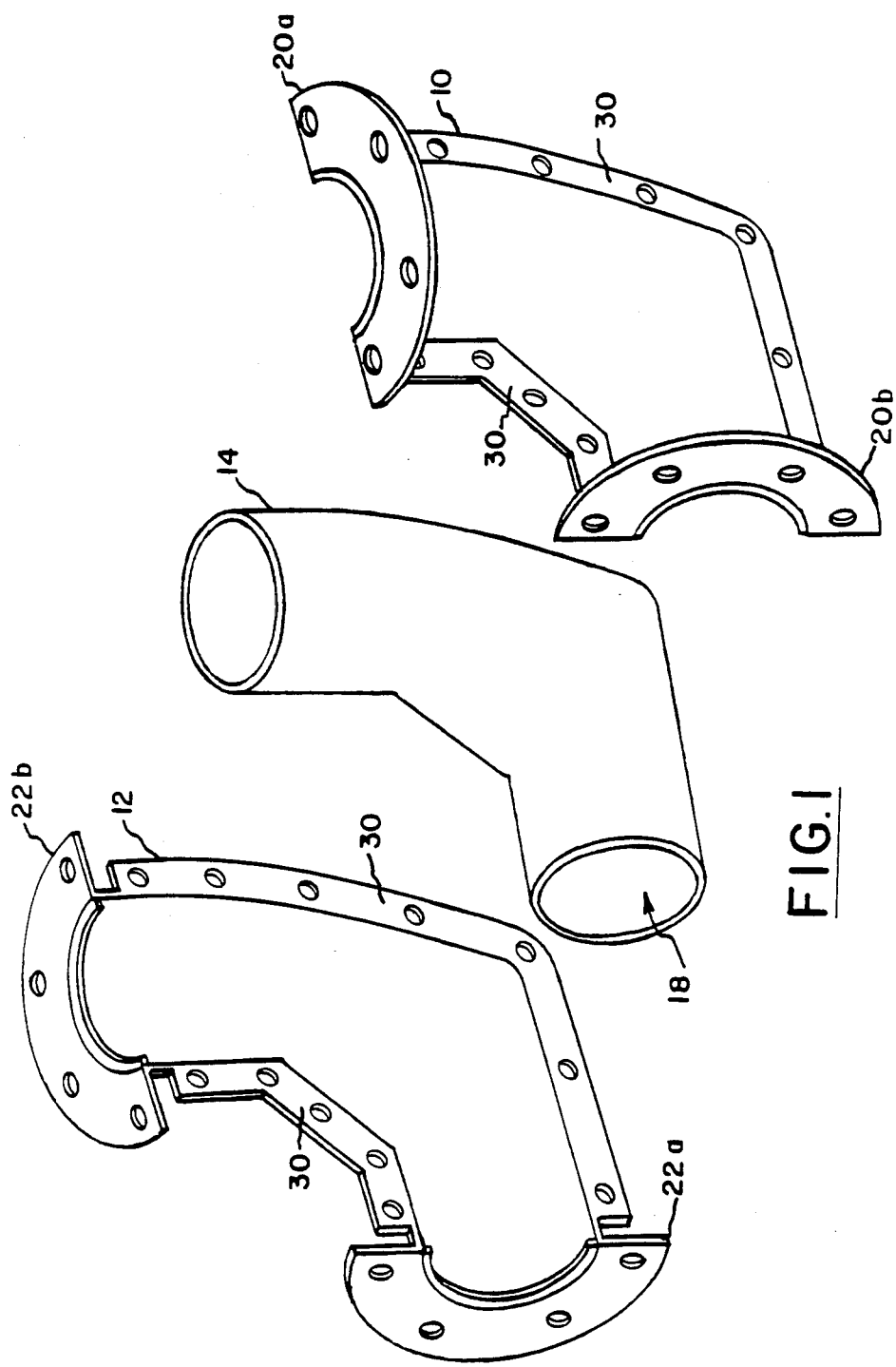
FIG. 1 shows the unassembled elements of a pipe segment according to the present invention in prospective view wherein an outer jacket or shell is split longitudinally so as to accommodate the rubber liner or "boot".

There is disclosed a wear resistant pipe segment which alters the direction of flow of particulate matter of an erosive nature comprising:

an inlet and exit portions that are circular in cross-section;

a connecting portion that is a closed U-shape in cross-section wherein the curved portion is on the inside of the bend and the outer surface of the bend lies on a plane or planes which are inclined at an angle or angles of at least 35°, but not more than 65° with reference to the direction of incoming flow;

said connecting portion having a cross sectional area through an impingement surface of at least 1.25 times the cross sectional area of the inlet portion;

said connecting portion being contoured smoothly to join with the exit portion;

said pipe segment being constructed of an elastomeric material.

There is also disclosed the wear resistant pipe segment described above wherein the pipe segment is wholly enclosed in an outer supporting shell in the shape of the pipe segment; said supporting shell is split longitudinally into a first half and a second half; the halves of the outer shell are clamped or secured together about the wear resistant pipe segment.

There is further disclosed a wear resistant pipe segment or elbow which alters the direction of flow of particulate matter having cylindrical inlet and outlet sections with a conduit portion therebetween the improvement in which:

said elbow is composed of an elastomeric material and said conduit portion connecting the inlet and outlet sections is a closed U-shape in cross-section and forms a first angle between the outer bend portion of said inlet section and said conduit section is in the range of about 125 to about 155 degrees, said conduit section at the outer bend is flat and lies in a plane or planes;

the inner bend portion is semicircular; and the cross-sectional area through the impingement surface is at least 1.25 times the cross-sectional area of the inlet section;

said conduit portion being contoured smoothly to join with the exit portion.

The present invention relates to the inner, one piece wear resistant elastomeric liner which can be supported by an outer shell. In one embodiment, the outer shell is longitudinally split to allow removal and replacement of the elastomeric inner liner.

The outer shell is of two halves and may be fabricated as any standard segment of pipe would be made, including the welding of flanges onto the metallic shell. The two halves of the outer shell are then clamped together to surround the inner elastomeric liner and secured to form the finished pipe assembly which is then placed in the conveying system. Upon wearing of the inner liner or boot, the outer shell may be unclamped and separated for removal and replacement of the inner liner.

The wear resistant pipe assembly is simple to manufacture and easy to maintain when compared to the prior art methods and products.

The inner liner or "boot" of the instant invention which possesses a unique shape may be composed of any elastomeric material known in the art. It is the unique shape or configuration of the inner liner in conjunction with the use of elastomeric materials for its construction that forms at least a portion of the basis of this invention.

The physical properties of the elastomeric material should be such that sufficient rebound and abrasion resistance are present in the compound. Representative of the elastomers which are useful in the fabrication of the boot include natural rubber and synthetic elastomers. Representative of the synthetic rubbers that are useful are polybutadiene, polyisoprene, polychloroprene, styrene-butadiene copolymers, isoprene butadiene copolymers, isobutylene-isoprene copolymers, ethylene propylene terpolymers, halogenated isobutylene-isoprene copolymers, acrylonitrilebutadiene copolymers and the like. The term rubber also includes a blend of natural rubber with one or more of the synthetic rubbers. The preferred elastomeric material for the construction of the inner liner is natural rubber.

The elastomer may be compounded with a filler such as carbon black, silica, calcium carbonate, titanium dioxide or the like. Also a softening agent such as mineral oil, vegetable oil, synthetic plasticizers or the like may be present. In addition, usual compounding ingredients conventionally used for the preparation of the vulcanized rubber articles are contemplated herein.

The rubber boot or elastomeric inner liner of the instant invention may be fabricated using methodologies known in the art. For example a plaster mold may be prepared and then utilized in conventional rubber molding techniques to construct the rubber boot. It should be noted that the boot in its preferred embodiment does not contain any reinforcement; however, reinforcement elements may be present and are contemplated herein.

A unique feature of the instant invention resides in the actual configuration of the elbow. In the case of a 90° elbow, the elastomeric inner liner possesses two hollow cylindrical portions (inlet and exit) whose axis are perpendicular to each other. Between the two cylindrical portions is a connecting portion.

The connecting portion is a closed "U"-shape in cross-section with the outer surface of the bend being the top of the "U" and essentially flat. This flat surface includes an impingement surface which is inclined at a first angle of at least 125°, but not more than 155° with reference to the axis of the cylindrical inlet portion or the direction of incoming flow. The impingement surface is essentially that surface that particles flowing through the inlet portion contact initially as they move from the inlet section to the connection portion. The angle of incidence "α" is the lesser included angle formed between the impingement surface and line of flight of the particles. It should be apparent from the figures that the inlet portion at the junction with the connecting portion is essentially a cylinder cut on a bias.

BRIEF DESCRIPTION OF THE PREFERRED EMBODIMENT

FIG. 1 shows an elbow pipe segment, in an unassembled state. Shown is an internal liner 14 composed of a wear-resistant elastomeric material. Also shown are two halves 10, 12 of an outer shell which is configured to surround the inner liner 14 in a protective and supportive fashion. The division between the halves 10, 12 of the outer shell has been made in a longitudinal fashion with respect to the flow path 18 through the inner liner 14. The outer shell is preferably made of metal, such as carbon or stainless steel or fiberglass. Flanges halves, 20a, 20b, 22a, 22b are welded or otherwise secured to the halves 10, 12 of the outer shell. These flange halves allow the assembled pipe segment to be secured to adjoining pipe segments or machinery. Any kind of connecting means or flanges are contemplated herein and those skilled in the art of pneumatic conveying will appreciate that the present invention can use any connecting methodology known in the art.

Clamping means are shown in the form of bands 30 which encircle the outer shell halves 10, 12 circumferentially and exert a compressive force by means of the action of screw means. It should be understood that the clamping means illustrated in the figures are but one of a wide variety of such devices known in the art and their function may equivalently be fulfilled by clamping means employing rams, dogs, tension bolts or other means.

Figure 2:
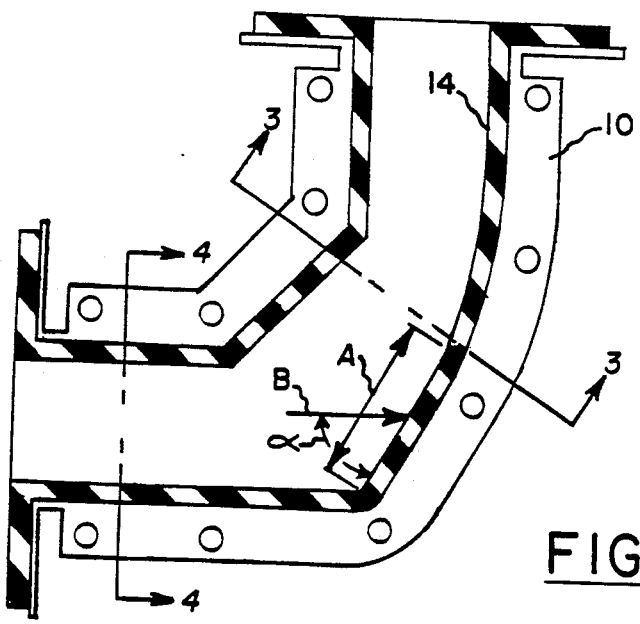
FIG. 2 is a side view of the instant invention with the inner liner or boot in cross section.
Figure 4:
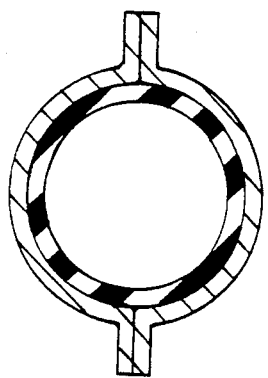
FIG. 4 is a sectional view taken along line 4—4 of FIG. 2 showing the circular cross-section of the inlet portion.

FIG. 2 shows in cross section, the inner liner of FIG. 1. The outer shell half 10 in combination with shell half 12 will encircle the inner liner 14 shown in cross section.

The purpose of the outer shell is to contain pressure as the inner liner or boot is not reinforced and must maintain its shape or configuration to achieve its wear resistant properties. It is contemplated herein, that a properly reinforced boot would not require an outer jacket. After use in the field, the inner liner 14 may be easily replaced when worn by simply unclamping the outer shell halves 10, 12 and removing the worn liner 14. A new liner 14 may then be installed and the entire segment reassembled and put back into service. This method for refurbishing the pipe segment according to the present invention reduces both time and equipment costs inherent to the replacement of wear resistant pipe segments known in the art.

The incidence angle is shown as α in FIG. 2 while the impingement surface is designated as "A". The incidence angle α is formed from the line of flight of the particulate matter being conveyed, shown as directional arrow B in FIG. 2, and the impingement surface. The vertical height of the impingement surface, "A", is at least 1.2 times the diameter of the inlet portion.

Figure 3:
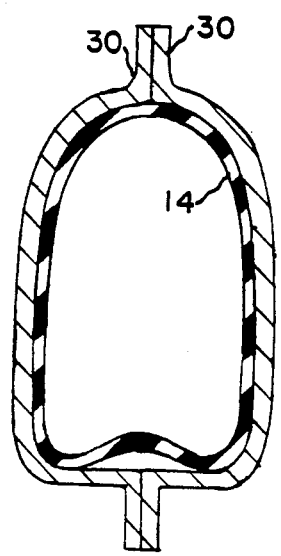
FIG. 3 is a sectional view taken along line 3—3 of FIG. 2 showing the boot in a non-pressurized state.

FIG. 3 is a sectional view taken along line 3—3 of FIG. 2 showing the inner liner in a non-pressurized state. As illustrated, the connecting portion of the device is closed "U" shape in cross-section with the impingement surface being essentially flat when pressurized. Clamping means 30 are depicted. It should be appreciated that the cross sectional area of the connecting portion once past the impingement surface will decrease as one approaches the exit portion of the device.

Best Mode

A 90° elbow according to this invention was constructed by first forming an aluminum mandrel conforming to the interior of the described device. The mandrel was then covered with thin sheets of a natural rubber based compound using FDA approved ingredients. Six layers of a sheet rubber were used to build a device approximately ⅜" thick. Jackets of fiberglass reinforced epoxy were also constructed to surround the inner liner.

The inner diameter of the inlet and exit portions was 3". The rubber article was cured in a steam autoclave using conventional temperatures and pressures. The rubber inner liner was stripped from the mandrel and placed in a pneumatic transport or conveying system.

The pneumatic conveying system was an industrial unit used to transport finely ground calcium carbonate at a rate of 1,100 pounds per minute. The test elbow was installed at a location 400 feet downstream of a rotary valve (start point of transport) and within 100 feet of the terminus of transport. The particle speeds at this elbow were in excess of 50 miles per hour as calculated. The pressure at the test elbow was measured at about 10 psi.

After nine months in service, the elbow was removed from service and inspected. The inspection revealed only negligible wear and at no point was the loss of thickness greater than 1/16". The projected life of this part would be in excess of 4 years. A conventional elbow previously used in this system constructed of 304SS metal has an expected lifetime of 1-2 years.

Both these and other advantages and embodiments of the present invention will be apparent to one skilled in the art upon close examination of the foregoing specification and the appended claims and drawing figures.

I claim:

1. A wear resistant pipe segment which alters the direction of flow of particulate matter of an erosive nature comprising:
    an inlet and exit portions that are circular in cross-section;
    a connecting portion that is a closed U-shape in cross-section wherein the curved portion is on the inside of the bend and the outer surface of the bend lies on a plane or planes which are inclined at an angle or angles of at least 35°, but not more than 65° with reference to the direction of incoming flow;
    said connecting portion having a cross-sectional area through an impingement surface of at least 1.25 times the cross-sectional area of the inlet portion;
    said connecting portion being contoured smoothly to join with the exit portion; said pipe segment being constructed of an elastomeric material.

2. The wear resistant pipe segment according to claim 1 wherein the pipe segment is wholly enclosed in an outer supporting shell in the shape of the pipe segment; said supporting shell is split longitudinally into a first half and a second half; the halves of the outer shell are clamped or secured together about the wear resistant pipe segment.

3. The wear resistant pipe segment according to claim 1 wherein said pipe segment is constructed of natural rubber or a synthetic elastomer.

4. The wear resistant pipe segment according to claim 1 wherein said pipe segment is constructed of a styrene/butadiene copolymer or polybutadiene.

5. The wear resistant pipe segment according to claim 1 wherein the direction of flow of the particulate matter is altered by 90°.

6. A wear resistant pipe segment or elbow which alters the direction of flow of particulate matter having cylindrical inlet and outlet sections with a conduit portion therebetween the improvement in which:

said elbow is composed of an elastomeric material and said conduit portion connecting the inlet and outlet sections, is a closed U-shape in cross-section and forms a first angle between the outer bend portion of said inlet section and said conduit section in the range of about 125 to about 155 degrees, said conduit section at the outer bend is a flat impringement surface and lies in a plane or planes;

the inner bend portion is semicircular; and the cross-sectional area through the impingement surface is at least 1.25 times the cross-sectional area of the inlet section;

said conduit portion being contoured smoothly to join with the exit portion.

7. The wear resistant pipe segment of claim 6 wherein the pipe segment is wholly enclosed in an outer supporting shell in the shape of the pipe segment; said supporting shell is split longitudinally into a first half and a second half, the halves of the outer shell are clamped or secured together about the wear resistant pipe segment.

8. The wear resistant pipe segment according to claim 6 wherein said pipe segment is constructed of natural rubber or a synthetic elastomer.

9. The wear resistant pipe segment according to claim 6 wherein said pipe segment is constructed of a styrene/butadiene copolymer or polybutadiene.

10. The wear resistant pipe segment or elbow according to claim 6 wherein the direction of flow of the particulate matter is altered by 90°.

* * * * *